March 23, 1937. E. W. COLLINS ET AL 2,074,366
ARMATURE ASSEMBLING MACHINE
Filed Sept. 15, 1934 9 Sheets-Sheet 3
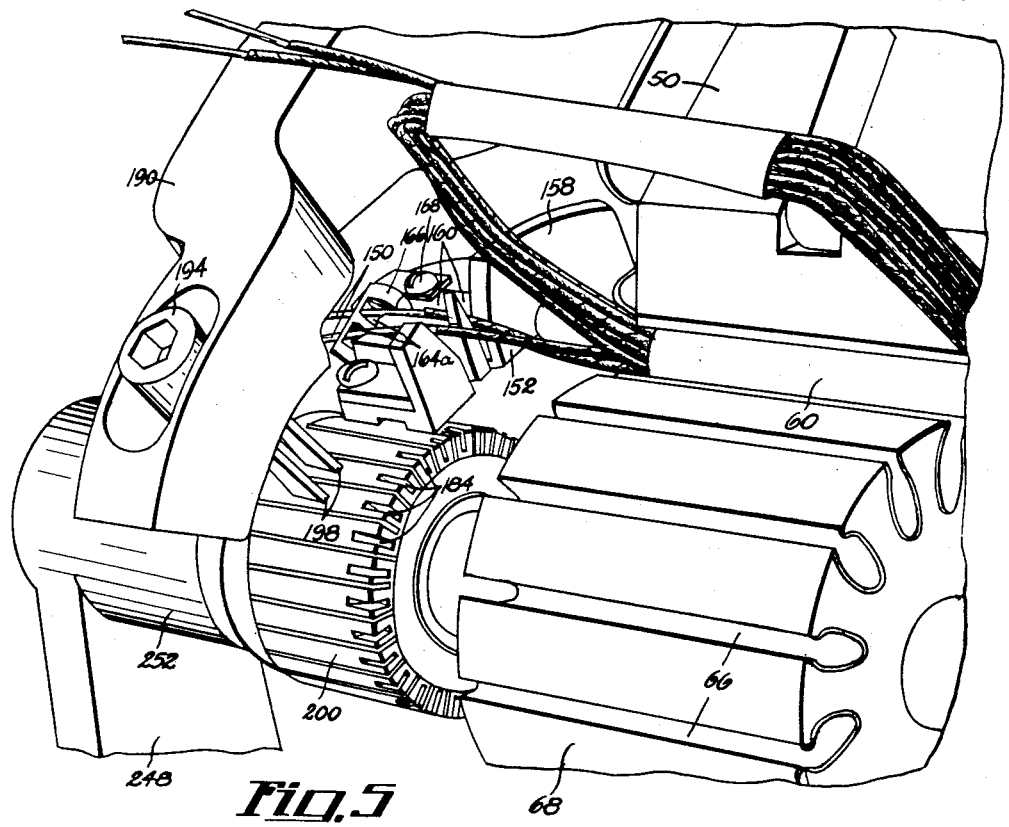
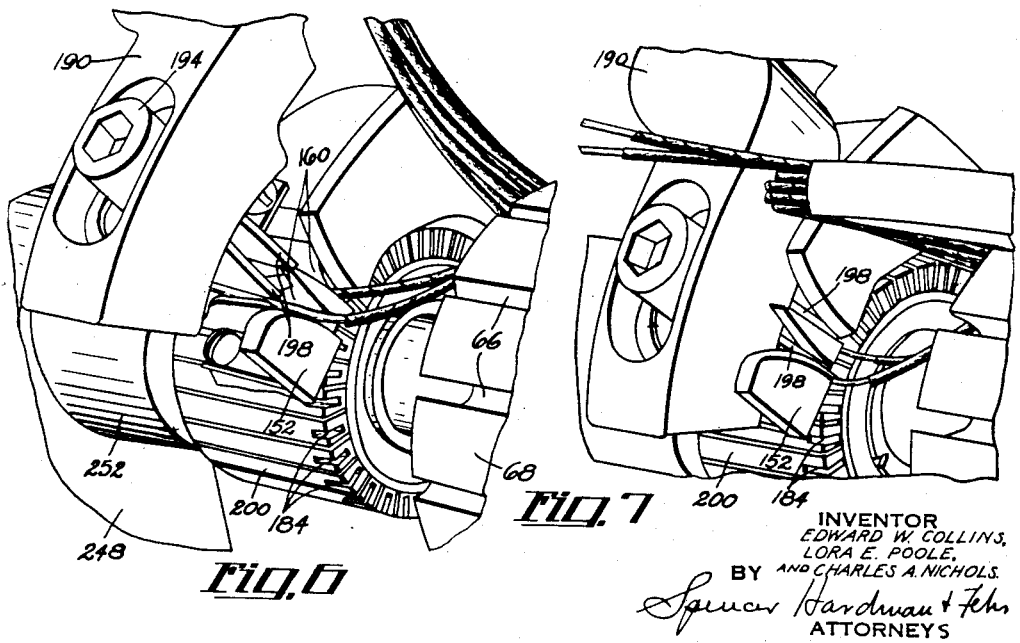
INVENTOR
EDWARD W. COLLINS,
LORA E. POOLE,
AND CHARLES A. NICHOLS.
BY
Spencer Hardman & Fehr
ATTORNEYS

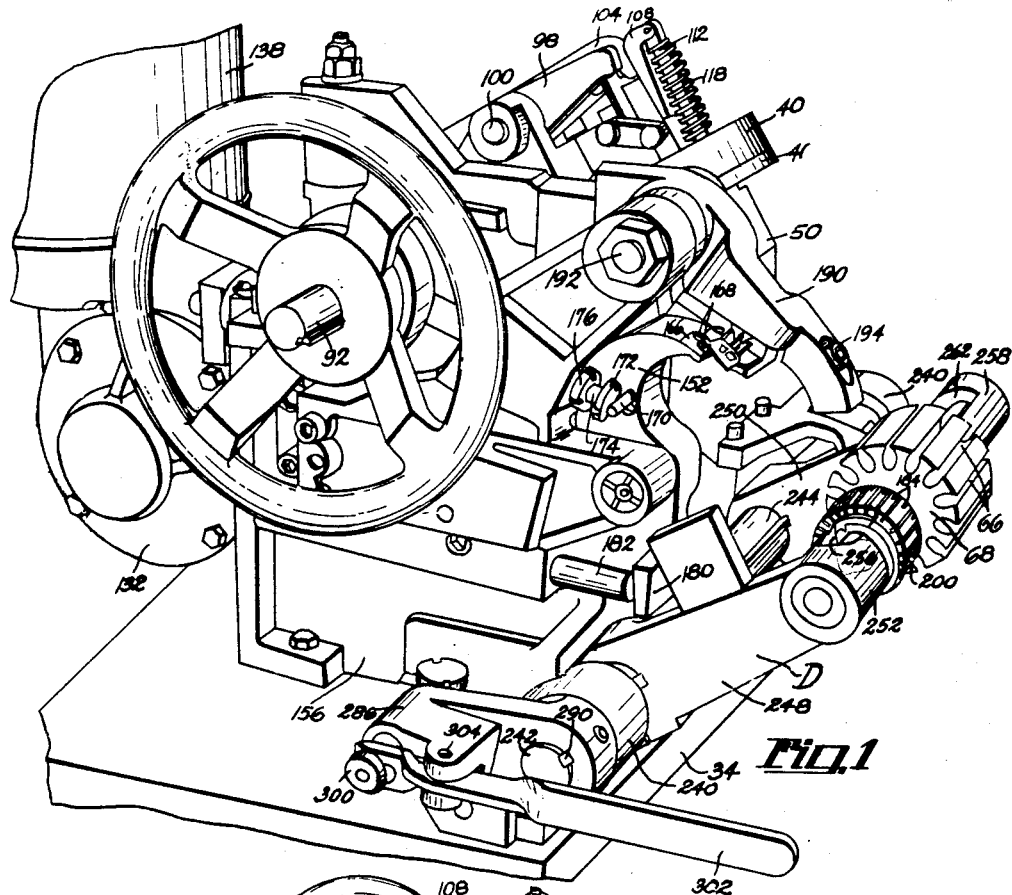

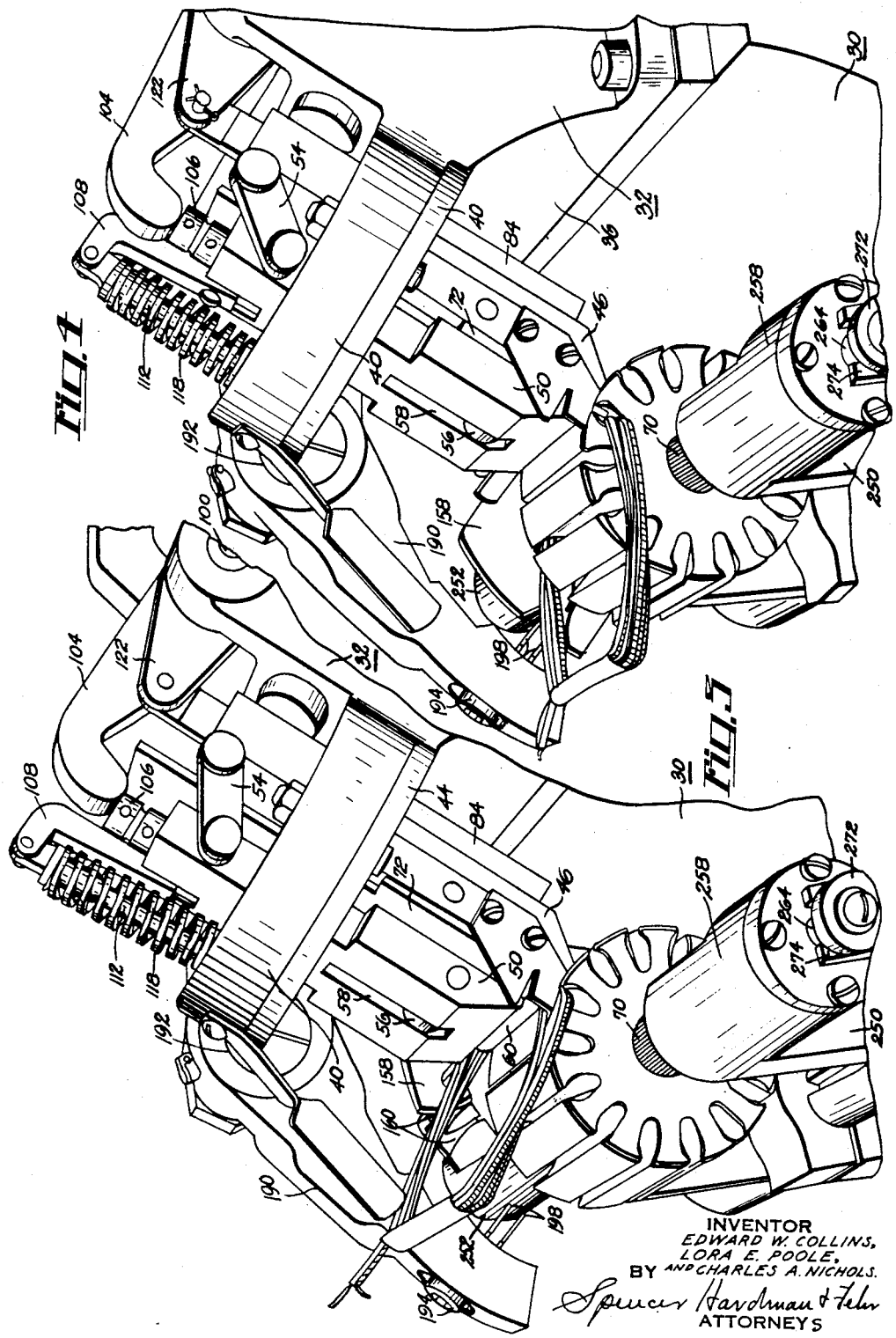

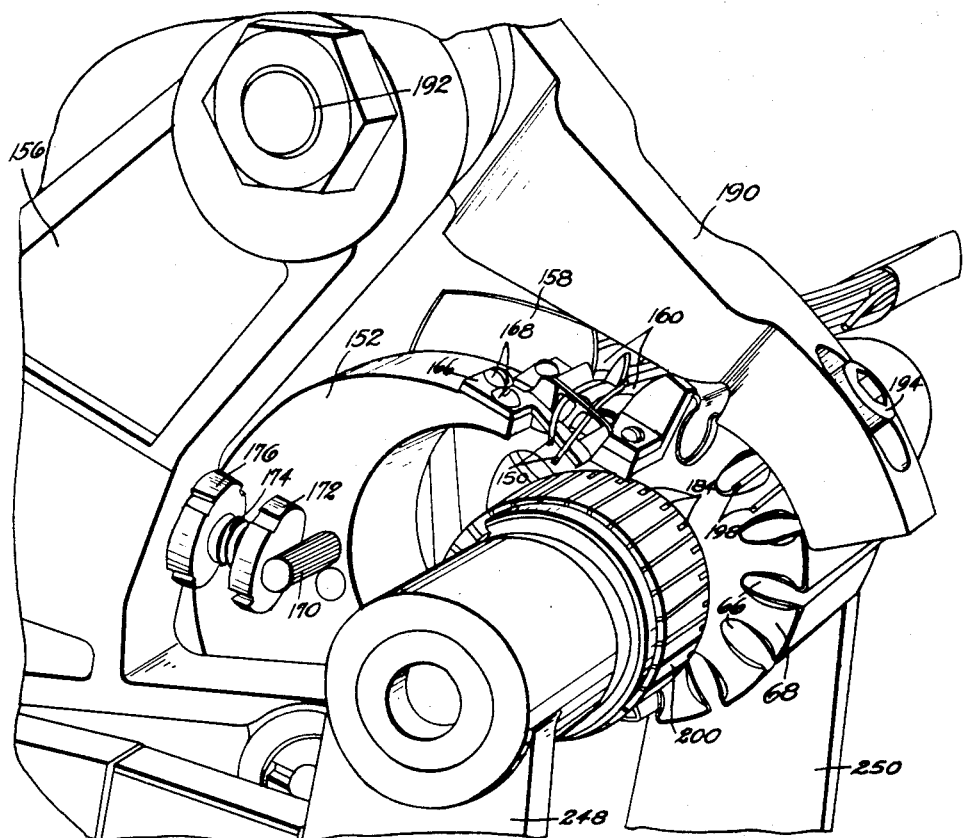
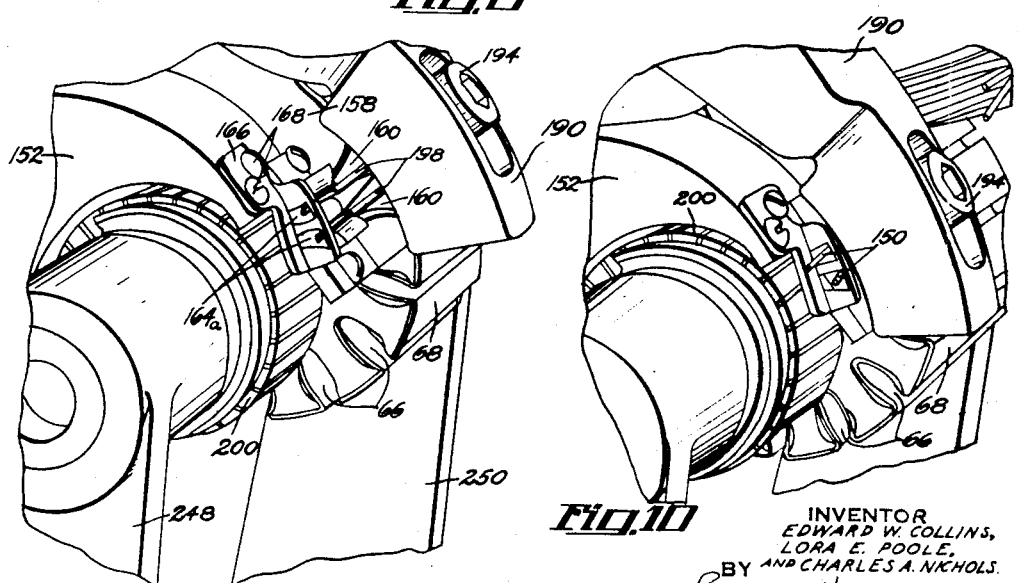

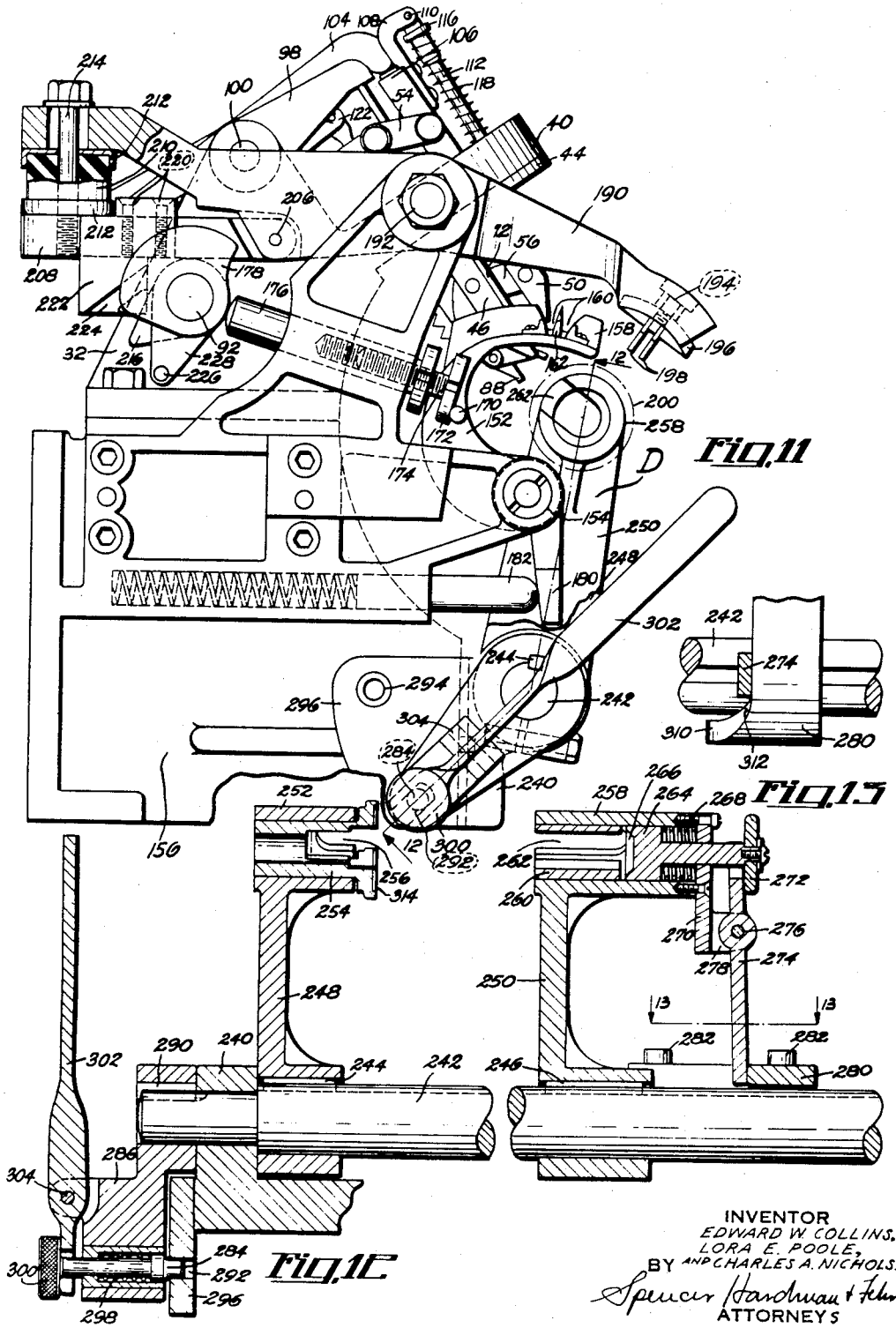

March 23, 1937. E. W. COLLINS ET AL 2,074,366
ARMATURE ASSEMBLING MACHINE
Filed Sept. 15, 1934 9 Sheets-Sheet 6

INVENTOR
EDWARD W. COLLINS,
LORA E. POOLE,
BY AND CHARLES A. NICHOLS.
Spencer Hardman &hr
ATTORNEYS

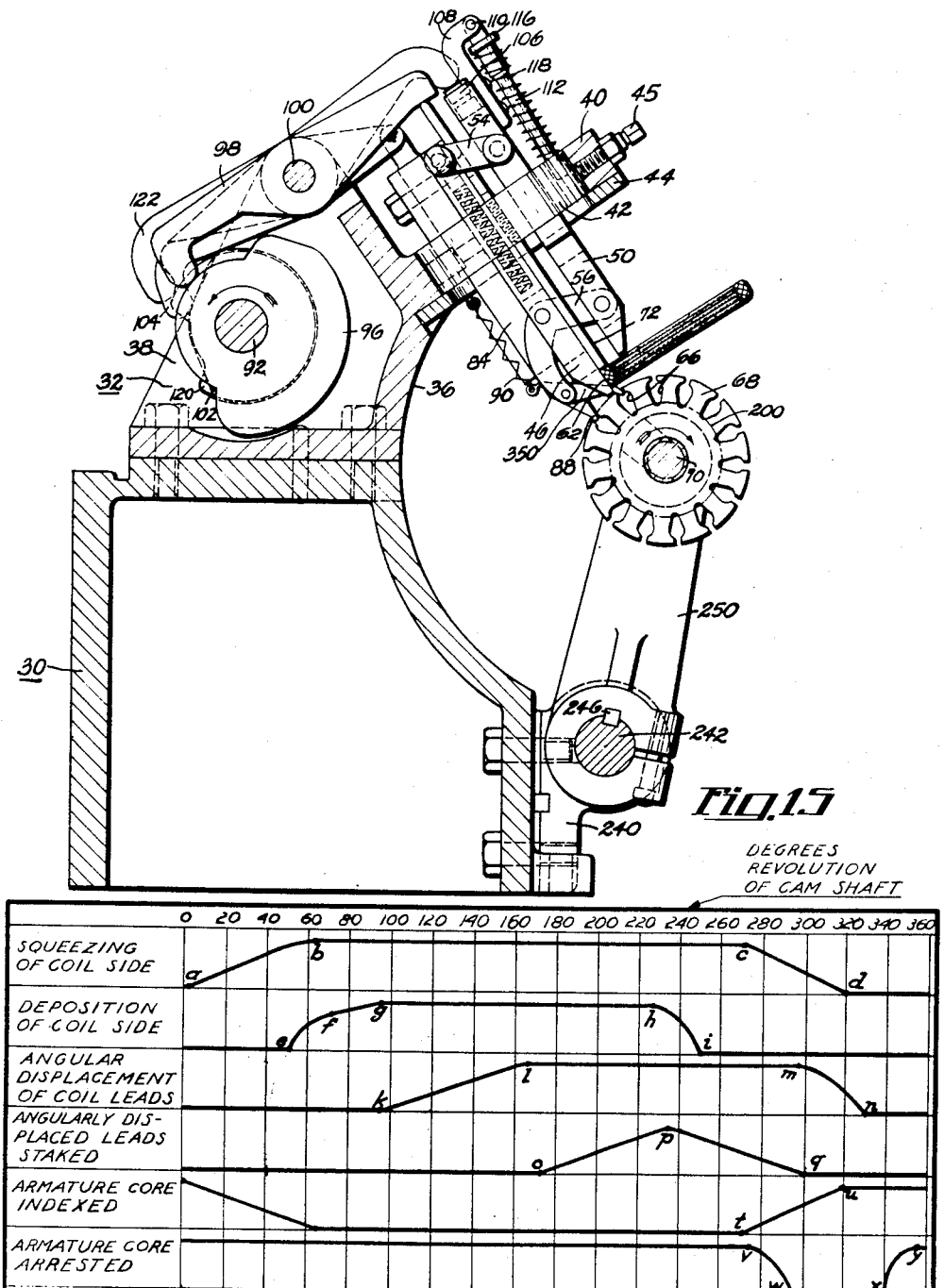

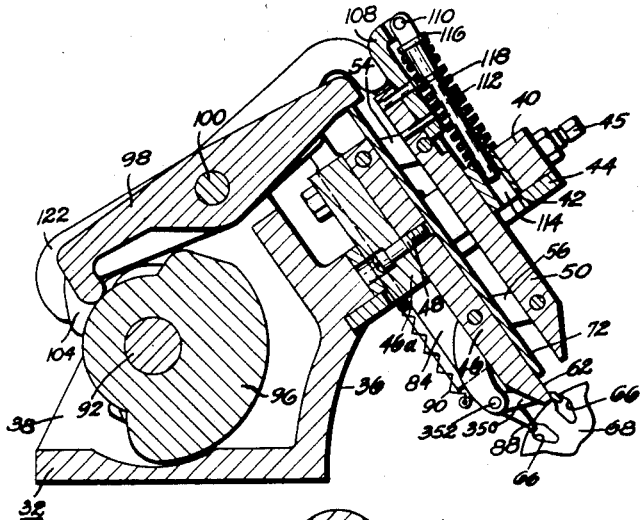
Fig.16
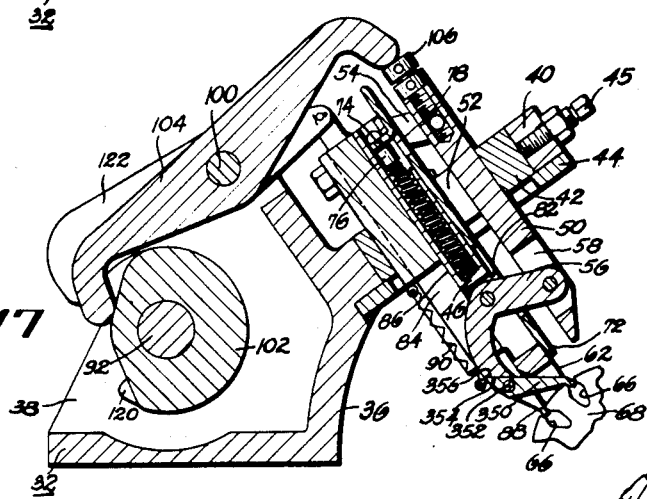
Fig.17
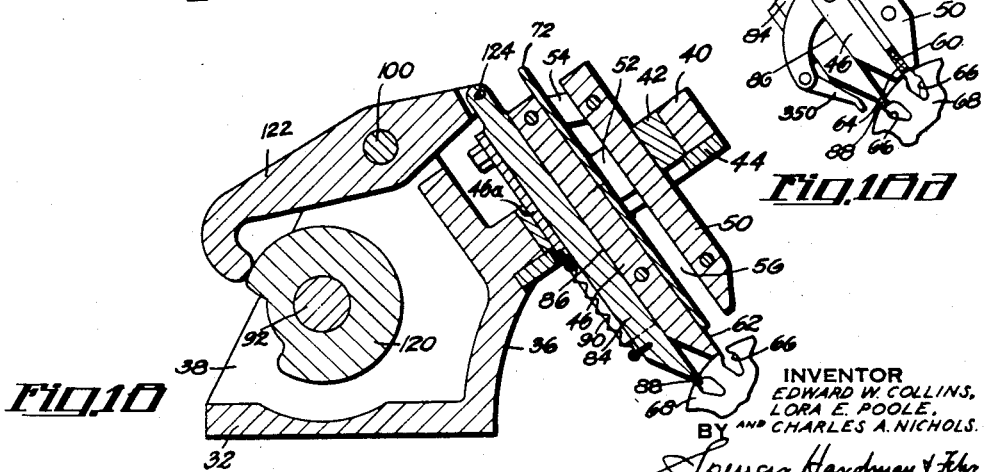
Fig.18
Fig.18a

March 23, 1937. E. W. COLLINS ET AL 2,074,366
ARMATURE ASSEMBLING MACHINE
Filed Sept. 15, 1934   9 Sheets-Sheet 9

INVENTOR
EDWARD W. COLLINS,
LORA E. POOLE,
AND CHARLES A. NICHOLS
BY
ATTORNEYS

Patented Mar. 23, 1937

2,074,366

UNITED STATES PATENT OFFICE 2,074,366

ARMATURE ASSEMBLING MACHINE

Edward W. Collins, Lora E. Poole, and Charles A. Nichols, Anderson, Ind., assignors to General Motors Corporation, Detroit, Mich., a corporation of Delaware Application September 15, 1934, Serial No. 744,152

69 Claims. (Cl. 29—84)

This invention relates to armature assembling machines and more particularly to a machine for assembling armature coils with an armature core and a commutator.

It is an object of the present invention to provide for the positioning of an active coil side in an armature core slot and angular displacement of the leads thereof into a position adjacent the commutator bars to which they are to be connected.

It is another object of the present invention to provide for the attaching of the angularly displaced coil leads to their corresponding commutator bars.

It is another object of the present invention to provide for the indexing of the armature core so as to present consecutive slots thereof to active coil sides to be positioned therein.

It is another object of the present invention to arrest the armature against rotation during a coil positioning and coil lead displacing and attaching operation.

It is another object of the present invention to provide for severing excessive length off the coil leads prior to their attachment to commutator bars.

It is a further object of the present invention to provide a machine which by slight adjustments can be adapted for the positioning of coil sides in armature core slots which may be parallel to the armature axis or skewed to a certain extent.

It is still another object of the present invention to provide for a facile loading and unloading of the machine with armatures.

Further objects and advantages of the present invention will be apparent from the following description, reference being had to the accompanying drawings wherein a preferred embodiment of the present invention is clearly shown.

In the drawings:

Fig. 1 is a fragmentary perspective view of a machine embodying the present invention.

Fig. 2 is another fragmentary view of the machine.

Fig. 3 is an enlarged fragmentary view of the machine disclosing more particularly the position of various elements of the machine prior to the insertion of an active coil side into an armature core slot.

Fig. 4 is a fragmentary perspective view similar to Fig. 3 showing however, an active coil side inserted in an armature core slot.

Fig. 5 is another enlarged fragmentary perspective view of the machine showing various elements thereof in a position prior to the angular displacement of two coil leads.

Fig. 6 is an enlarged fragmentary perspective view similar to Fig. 5, showing however the coil leads in alignment with their respective commutator bars.

Fig. 7 is a fragmentary perspective view similar to Fig. 6, showing the coil leads staked into commutator bar slots.

Figs. 8 to 10 inclusive, are enlarged fragmentary perspective views of the machine and disclose various steps in the operation of the coil lead displacing device and coil lead staking device.

Figure 11:
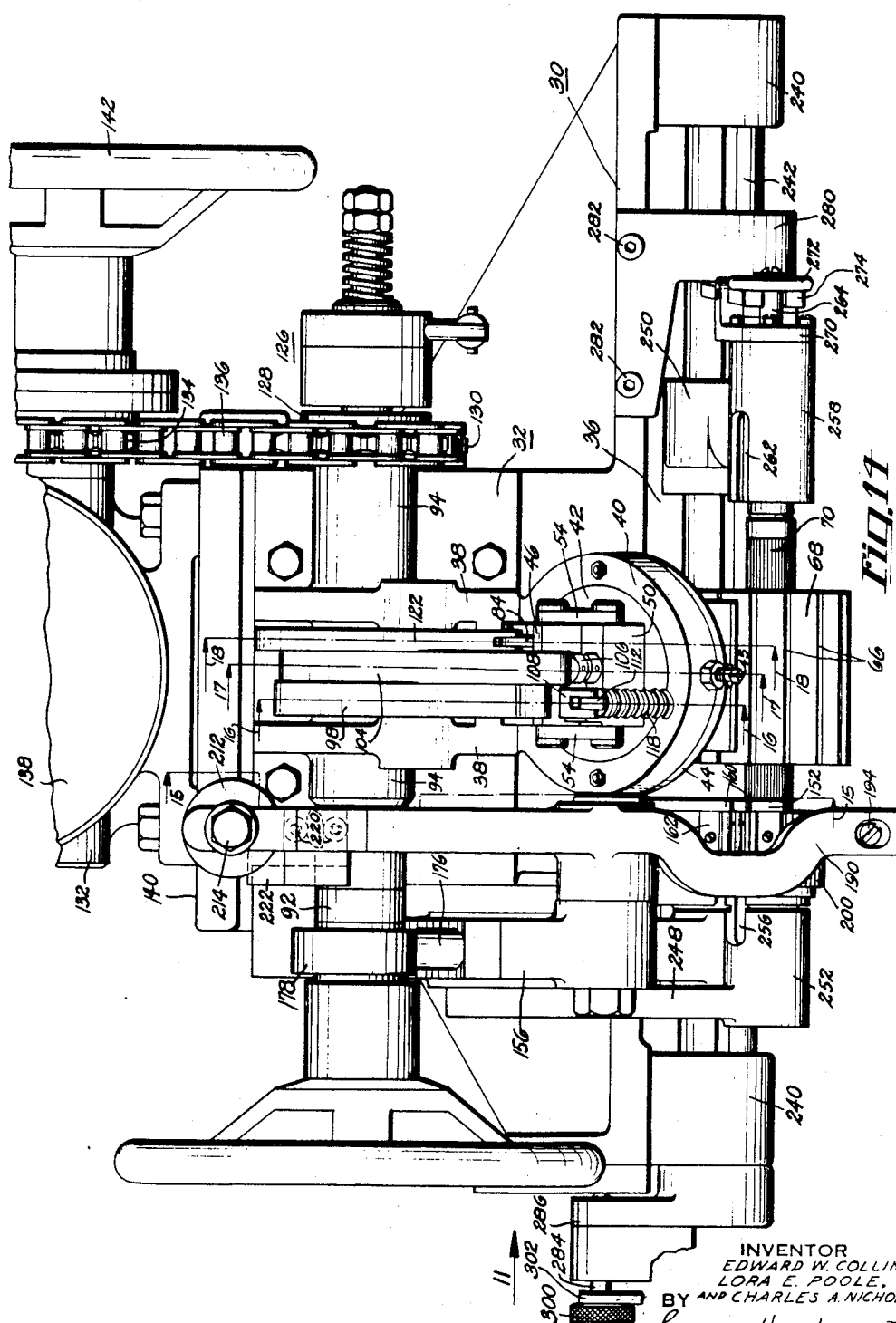

Fig. 11 is a fragmentary side elevation of the machine as viewed in the direction of arrow 11 in Fig. 14.

Fig. 12 is a section taken substantially on the line 12—12 of Fig. 11.

Fig. 13 is a fragmentary section taken substantially on the line 13—13 of Fig. 12.

Fig. 14 is a fragmentary plan view of the machine.

Fig. 15 is a section taken on the line 15—15 of Fig. 14.

Figs. 16 to 18 inclusive are fragmentary sections taken on the lines 16—16, 17—17, and 18—18, respectively, of Fig. 14.

Fig. 18a is a fragmentary view showing an active coil side in a position to be inserted into an aligned armature core slot.

Figures 19, 20, 21:
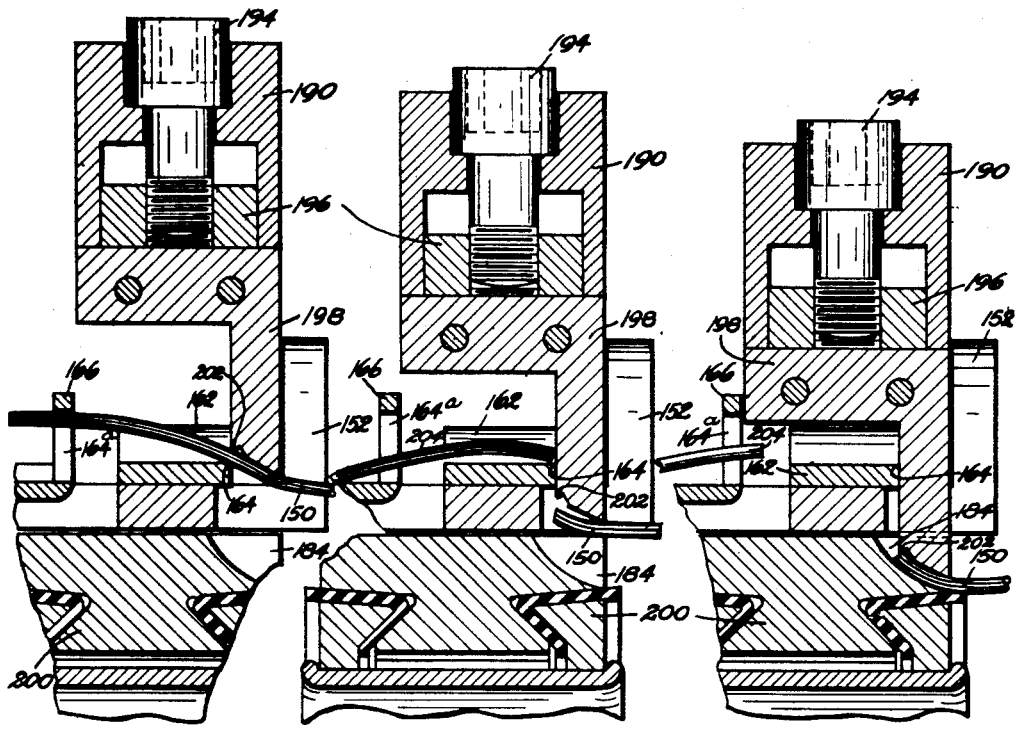

Figs. 19 to 21 inclusive illustrate progressive steps in the operation of the severing and staking device of the machine, these figures being enlarged fragmentary sections.

Fig. 22 is a chart illustrating the timed relationship which exists between the various operations performed by various devices of the apparatus during one complete revolution of the cam shaft of the machine.

The present machine is adapted to insert the first of the two active sides of armature coils into armature core slots, angularly to displace the leads of the inserted coil sides into alignment with their respective commutator bars and finally to sever excessive length from the leads and to stake the leads of proper length into previously cut slots of the aligned commutator bars. The machine embodies certain devices which perform the just mentioned operations and which will be described in detail in the order in which they are presently mentioned.

The first cycle of operation of the machine is performed by a coil side positioning device A, immediately thereafter a coil lead displacing device B comes into operation and at the end thereof a coil lead severing and staking device C completes one operation of the machine.

The various devices, including an armature support D, are carried by two superposed frames 30 and 32 which are mounted on any suitable bed or base 34.

Coil side positioning device A

Referring more particularly to Figs. 2 to 4 inclusive, and 14 to 18 inclusive, frame 32 is provided with a curved front wall 36 which is flanked by two side walls 38. Integral with the front wall 36 of frame 32 is a ring-shaped extension 40 in which is rotatably supported a disc 42 which is retained therein by means of a ring plate 44, suitably attached to said extension, and a set screw 45. Secured within suitable recesses of the disc 42 are two plates 46 and 46A which are secured together by means of a screw 48. Adapted to cooperate with the stationary coil side aligning plate 46 is a cooperating coil side aligning plate 50 which is movable to and from plate 46 in a recess 52 of disc 42 and movably supported by said plate 46 by means of two opposite links 54 (see Fig. 14) and a link 56 which is received in a groove 58 substantially in the middle of the movable aligning plate 50. As best shown in Fig. 3, an active coil side 60 is held by the operator against the surface 62 of the stationary plate 46, while the cooperating movable plate 50 is most retracted from that surface. Upon rotation of all the links clockwise as viewed in Figs. 16 to 18 inclusive, by means to be described later, the movable plate 50 will approach its companion plate 46 and finally assume the position shown in Fig. 18a, whereby an active coil side is squeezed between the companion plates 46, 50 which form a direct track or guide groove 64 into a core slot 66 of an armature core 68, mounted on an armature shaft 70 which is properly supported in operating position by the earlier mentioned armature support D to be described later. As best shown in Fig. 17, an ejector blade 72 rests on the surface 62 of the stationary plate 46 and is provided with a projecting lug 74, punched out from said blade and bearing against a spring urged plunger 76 which is carried by the stationary plate 46. Lug 47 projects through an oblong slot 78 of the stationary plate 46 and is normally urged by said spring urged plunger into most retracted position (see Fig. 17). Blade 72 is furthermore provided with an aperture 82 through which the link 56 extends without in the least interfering with the preassigned movement of blade 72 relative to the stationary plate 46. After a coil side 60 has been aligned with a core slot 66 between the two companion plates 46, 50 and while these plates remain in the position shown in Fig. 18a, the blade 72 is moved from the position shown in Fig. 17 to that shown in Fig. 4 by means to be described later, thereby ejecting the aligned coil side 60 from between the aligning plates 46, 50 into the properly aligned core slot 66. In order to prevent rotation of the armature on its support D while a coil side is properly aligned with an armature core slot and during the coil side inserting operation, an arrester 84 is longitudinally movable along the rear surface 86 of stationary plate 46 and retained thereon by the correspondingly grooved plate 44. One end of the arrester is formed into a finger 88 which, as best shown in Fig. 15, enters a core slot and thereby prevents rotation of the armature on its support. A tension spring 90 normally tends to retract the arrester 84 from the armature core 68.

The movable aligning plate 50, the ejector blade 72 and the arrester 84 are moved by a plurality of cams all of which are mounted in any suitable manner on a cam shaft 92 which is journaled in bosses 94, projecting from the two side walls 38 of frame 32. As best shown in Fig. 16, a cam 96 on the cam shaft 92 cooperates with a rocker arm 98 which is pivotally mounted on a shaft 100, carried by the frame 32, and cooperates with the ejector blade 72. The spring urged plunger 76 (see Fig. 17) normally urges the rocker arm 98 into engagement with its cam 96 as can be readily understood. As best shown in Fig. 17, a cam 102, also mounted on the cam shaft 92, cooperates with a rocker arm 104 which is also pivoted to shaft 100 and cooperates with an adjustable head screw 106, received by the movable plate 50. As best shown in Fig. 16, an L-shaped member 108 is attached to the movable plate 50 and pivotally supports at 110 a rod 112, the free end of which is received in a comparatively large opening 114 of the disc 42. Surrounding said rod 112 and interposed between a collar 116 thereof and the ring 42 is a compression spring 118 which normally urges plate 50 into the most retracted position disclosed in Figs. 16 to 18 inclusive, thereby also yieldingly retaining the rocker arm 104 in constant engagement with cam 102. Referring more particularly to Fig. 18, a third cam 120 is mounted on the cam shaft 92 and cooperates with a rocker arm 122, pivotally mounted on shaft 100 and floatingly pivotally connected at 124 to the arrester 84. The earlier mentioned tension spring 90 normally retains the rocker arm 122 in engagement with its cam 120 as can be readily understood.

Mounted on the cam shaft 92 adjacent one of the bearing bosses 94 of frame 32 is any conventional one revolution clutch 126, the idle half 128 whereof is provided with a sprocket wheel 130 which is driven from the slow shaft of a conventional reduction gearing 132 by means of a sprocket wheel 134 on said slow shaft and a chain 136 which connects both sprocket wheels. An electric motor 138 is directly connected with and mounted on the reduction gearing 132 which in turn is mounted in any suitable manner on the rear wall 140 of frame 30. Attached to the slow shaft of the reduction gearing 132 in any suitable manner is a handwheel 142 for manually operating the machine, for instance after a readjustment of one or more elements of the machine before the same can be power operated again. The one revolution clutch 126 is operated by a suitable foot pedal and connecting links (not shown).

Lead displacing device B

Referring more particularly to Figs. 5 to 11 inclusive, and 19 to 21 inclusive, the two coil leads 150 which emerge from the active coil side 60 are to be angularly displaced with respect to coil side 60 by means of a curved lever 152, pivotally mounted at 154 to a frame 156 which abuts the earlier described frames 30 and 32. This lever 152 is provided with an angle shaped portion 158 one flange of which is provided with two wedge shaped notches 160 as best shown in Figs. 5 to 7 inclusive, and the other flange supports a similarly notched steel plate 162 the corners 164 whereof serve as shearing edges. While an active coil side 60 is located on the stationary aligning plate 46, the two coil leads 150 thereof are guided into the notches 160 of lever 152 in the manner disclosed in Figs. 5 and 8. In order to prevent the thus located coil leads 150 from moving out of their respective notches 160, the coil leads are furthermore guided through apertures 164a of an angle 166 which is secured to the lever 152 by a plurality of screws 168. Projecting from the lever 152 is a pin 170 against which bears the head 172 of an adjustable screw 174 which is received by one end of a splined cylindrical bar 176 movable longitudinally through the bracket 156 and cooperating with its opposite end with a cam 178 which is mounted in any suitable manner on cam shaft 92. The lever 152 is furthermore provided with an extending arm 180 against which bears a spring urged plunger 182, received by the frame 156 and normally urging the lever 152 into the inoperative position shown in Fig. 11. Rotation of the cam 178 in the proper direction causes rotation of the lever 152 from the position shown in Fig. 11 to that shown in Figs. 6 or 9, in which the angle shaped portion of said lever substantially abuts the periphery of the commutator and the displaced leads 150 are in alignment with the commutator bar slots 184 into which they are to be staked by a

Lead severing and staking device C

Referring more particularly to Figs. 5 to 11 inclusive, 14 and 19 to 21 inclusive, a staking lever 190 is pivotally mounted at 192 to the side frame 156. Secured in an apertured end of the staking lever 190 by means of a countersunk screw 194 is a curved steel block 196 from which project two staking blades 198 which upon rotation of lever 190 in clockwise direction as viewed in Fig. 11 approach the commutator 200 of a properly supported armature substantially radially thereof. The staking blades 198 are so located with respect to the coil side aligning plates 46, 50 and the ejector blade 72 that the staking blades are in alignment with the commutator bar slots which are to receive the coil leads 150 of a coil side which is located intermediate the companion plates 46, 50 and ejected into an aligned armature core slot. The two staking blades 198 are spaced apart a distance which is equal to the distance between consecutive commutator bar slots 184. While the coil leads 150 are held in alignment with their respective commutator bar slots by the lever 152 as shown in Figs. 6 and 9, lever 190 is rotated clockwise as viewed in Fig. 11 by means to be described later, whereupon the staking blades 198 approach the periphery of the commutator 200. During such approaching movement of the staking blades, the edges 202 thereof cooperate with the shearing edges 164 of the steel plate 162 and shear excessive length off the coil leads 150 in the manner illustrated in Figs. 19 and 20. Upon continued clockwise rotation of lever 190, the shorn coil leads are staked into their respective commutator bar slots 184 by the staking blades 198 as best illustrated in Figs. 20 and 21. The severed lead ends 204 which project considerably beyond the apertured angle 166 fall therefrom as can be readily understood. Pivotally mounted at 206 to the lever 190 is a bar 208 between which and the opposite end of lever 190 a rubber block 210 is interposed. The rubber block 210 is located in retainers 212 and a head screw 214 normally clamps the bar 208, the lever 190, the retainers 212 and the rubber cylinder 210 together. Cooperating with the bar 208 is a cam 216 which is mounted in any suitable manner on the cam shaft 92. The motion derived from the cam 216 is transmitted to the lever 190 through the rubber block 210 so that in case the staking blades 198 find some unforeseen obstruction, they will not break because the rubber block 210 will then be sufficiently compressed and take up the assigned motion of the stopped staking blades. Secured by countersunk screws 220 to the bar 208 is a block 222 having an inclined groove 224 with which a projecting pin 226 of a disc 228 on cam shaft 92 is adapted to cooperate. The eccentric pin 226 and the cam 216 are so coordinated that after the cam has moved the lever 190 into staking position, the pin 226 will enter the groove 224 thereby positively rotating the lever 190 from the staking position into the inoperative position shown in Fig. 11. It is however imperative that while the eccentric pin 226 positively rotates the staking lever 190 into the inoperative position shown in Fig. 11, the cam 216 is rotating slightly in advance of bar 208 so as to be out of engagement therewith and prevent an interference between the cam and the cooperating pin 226 and inclined groove 224.

Armature support D

Referring more particularly to Figs. 11 to 15 inclusive, two spaced bearing brackets 240 are mounted in any suitable manner on frame 30. Journaled in these bearing brackets is a shaft 242 to which is keyed at 244 and 246 two armature shaft supporting brackets 248 and 250. Bracket 248, which abuts the bearing bracket 240 as shown in Fig. 12, is provided with a boss 252 which press-fittedly receives a sleeve 254 having a longitudinal slot 256 in its side wall for the lateral introduction of one end of the armature shaft 70 into the bearing sleeve 254. The other bracket 250 is also provided with a boss 258, receiving a longitudinally slotted sleeve 260, the slot 262 thereof extending through the boss 258, thereby permitting the lateral introduction of the opposite end of the armature shaft 70 into the sleeve 260. Slidable longitudinally within the boss 258 is an armature shaft retainer 264, having a tapered recess 266 which is adapted to receive the very end of said armature shaft and prevent lateral removal of the armature shaft from the sleeve 260 as will be more fully explained presently. The retainer 264 is normally urged into retaining position by means of a compression spring 268 which is interposed between said retainer and a bracket 270, attached to the boss 258. The retainer 264 is also provided with a collar 272 which is engaged by the forked end of a lever 274, pivotally mounted at 276 to bearing lugs 278 of the bracket 270. The opposite end of lever 274 is normally in engagement with a curved cam 280 which, as best shown in Fig. 14, is secured by head screws 282 to the frame 30. The bearing brackets 248, 250 are held in the position shown in Fig. 11 by means of an arrester pin 284 which is carried by a lever 286, keyed at 290 to the shaft 242 as best shown in Fig. 12. This pin 284 is normally urged by means of a compression spring 298 into registry with either one of two holes 292 and 294 in a steel plate 296 which is secured in any suitable manner to one of the bearing brackets 240. The pin 284 has a knurled collar 300 against which bears the forked end of a lever 302 which is pivotally mounted at 304 to the lever 286. After an armature has been completely operated upon by the various devices of the present machine, the operator withdraws the pin 284 from registry with the hole 292 by manipulating lever 302 whereupon the armature supporting brackets

248, 250 rotate by gravity into the position shown in Fig. 1 as can be readily understood from Fig. 11. While the armature supporting brackets 248, 250 thus rotate into the position shown in Fig. 1, the yieldingly urged pin 284 will finally register with the hole 294 thereby arresting the supporting brackets in the position shown in Fig. 1, in which a just finished armature is removed and a new armature is inserted in a manner to be described presently. As can be best understood from Figs. 12 and 13, the armature shaft retainer 264 is in a most retracted position due to the fact that in the loading position of the supporting brackets as shown in Fig. 1, the lever 274 cooperates with the high portion 310 of the curved cam 280. The brackets 248, 250 are so spaced from each other that when the retainer 264 is entirely retracted, an armature shaft can be laterally introduced into the bearing sleeves 254 and 260 through the slots 256 and 262, respectively. Next the operator will manipulate the lever 302 in order to move the armature supporting brackets 248, 250 into the position shown in Fig. 11 and during such movement of the brackets, the lever 274 will gradually approach the low portion 312 of the curved cam 280 whereby the retainer 264 moves toward the left as viewed in Fig. 12 under the compression of spring 268, thereby pushing the armature shaft to the left until the commutator 200 thereon abuts the end face 314 of bearing sleeve 254. When the commutator thus abuts end face 314 of sleeve 254, the adjacent end of the armature shaft 70 is beyond the slot 256 as indicated in dot-and-dash lines in Fig. 12 so that this shaft end cannot be removed laterally through the slot 256 anymore. The opposite end of the armature shaft is likewise prevented from lateral removal from its bearing by the tapered recess 266 of the yielding retainer 264. Thus it will be understood that once the armature is laterally introduced into the bearing sleeve 254, 260, the same is automatically arrested therein and again automatically released for lateral removal from the bearing sleeves after the bearing brackets 248, 250 have been brought into the loading position shown in Fig. 1, for the exchange of armatures.

At the end of each operation of the machine, the armature is indexed so as to present successive armature core slots to the coil side positioning device A. Referring to Figs. 15 to 17 inclusive, there is shown an indexing pawl 350, pivotally mounted at 352 to the link 56 and having a shoulder 354 which is normally engaging a shoulder 356 of the link 56. As appears best from Fig. 17, the pawl is engaging the entrance to a core slot 66 when the movable aligning plate 50 is in the position shown in this figure. When the aligning plate 50 is moved into the position shown in Fig. 18a, the pawl follows link 56 by gravity into the position shown in this figure. Toward the end of one operation of the machine, the aligning plate 50 is retracted into inoperative position and the pawl 350 is moved from the position shown in Fig. 18a to that shown in Fig. 17. During such movement the pawl registers with a core slot 66 and rotates the armature until at the end of such movement said core slot is in alignment with the coil positioning device A. The very first step in the following operation of the machine is the movement of the aligning plate 50 into the position shown in Fig. 18 whereby the indexing pawl 350 is again retracted into the position shown in this figure until toward the end of the operation of the machine another indexing operation takes place again in the described manner.

While the drawings disclose an armature core the slots of which are parallel to the armature axis, it is to be understood that the present machine can also be adapted for the assembly of coils with armatures, the core slots of which are skewed. In that case the set screw 45 is merely loosened and the disc 42, which carries the aligning plates, the ejector blade and the core arrester, is rotated until the aligning plates 46, 50 are parallel to the skewed armature core slots. The adjustment of the disc 42 is naturally limited and primarily determined by the extent to which the disc 42 may be rotated while the various rocker arms are still in engagement with their respective elements such as the ejector blade 72 etc.

Mode of operation

For better understanding of the operation of the machine as well as the cooperation between the various devices thereof, one complete operation of the machine will now be described in detail with special reference to the cam chart shown in Fig. 22. Assuming that the apparatus is in the inoperative position shown in Fig. 1 and an armature has just been inserted into the bearing sleeves 254, 260, in the earlier explained manner the operator will next manipulate lever 302 in order to bring the armature with its supporting brackets 248, 250 into the position shown in Fig. 11. While doing this, the operator has to pay attention that one of the armature core slots 66 registers with the core arrester 84 so that the following indexing operations properly take place. Next the operator will guide the two coil leads 150 of an active coil side 60 into the notches 160 of lever 152 and through the apertures 164 of the angle 166, and at the same time hold said active coil side 60 against the face 62 of the stationary aligning plate 46 in the manner shown in Fig. 15. So far the operator has performed preparatory manipulations and the machine is now ready for operation. The operator, by stepping on the earlier explained but undisclosed foot pedal, actuates the one revolution clutch, thereby making driving connection between the electric driving motor and the cam shaft 92. Immediately after the cam shaft 92 starts to rotate, the movable aligning plate 50 approaches its stationary companion plate 46, requiring approximately 60 degrees revolution of the cam shaft as represented by the line $a$—$b$ in the cam chart. During approximately the next 210 degrees revolution of the cam shaft aligning plate 50 remains in the position disclosed in Fig. 18. Movement of the movable aligning plate 50 into the inoperative position shown in Figs. 16 to 18 inclusive, finally takes place during the next 50 degrees revolution of the cam shaft as represented by the line $c$—$d$ in the cam chart. Before the movable aligning plate 50 actually assumes the position shown in Fig. 18a, the ejector blade 72 starts to move on its ejecting stroke as caused by cam 96 and rocker arm 98. The movable aligning plate however, has assumed the position shown in Fig. 18a, when the ejector blade engages and starts to eject the aligned coil side 60 from between the companion plates 46, 50 into the armature core slot 66. Rapid advancing movement of the ejector blade 72 into engagement with the aligned coil side 60 is represented in the chart by the line $e$—$f$, the following slow ejecting movement of the blade 72 being represented by the line $f$—$g$. The injector blade 72 remains for some time in the position shown in Fig. 4 and finally is retracted again as represented by the line $h-i$ in the chart. As soon as the active coil side 60 is injected into the aligned core slot 66, the lead displacing lever 152 is rotated from the position shown in Fig. 11 to that shown in Figs. 6 or 9 due to the cooperation of cam 178 with the cam follower 176. This follows clearly from the line $k-l$ of the chart, point $k$ of which is vertically below the point $g$ which represent the end of the coil side injecting operation. While the lead displacing lever 152 is in the position shown in Figs. 6 or 9, the staking lever 190 is rotated from the position in Fig. 11 to that shown in Figs. 7 or 10, whereby excessive length is first shorn off the displaced coil leads 150 and the latter are then staked into the commutator bar slots 184 in the earlier described manner. Movement of the staking lever 190 into staking position is represented by the line $o-p$ of the chart and the immediately following rotation of said lever back into the inoperative position shown in Fig. 11 is represented by the line $p-q$. It follows from the chart that the staking lever is moved into staking position and then immediately returned into inoperative position while the lead displacing lever 152 is in the operative position shown in Figs. 6 or 9. The line $l-m$ in the chart represents the time during which the lead displacing lever 152 is in the operative position shown in Figs. 6 or 9, and the line $m-n$ represents the movement of the lead displacing lever 152 from the operative position into the inoperative position shown in Fig. 11. As earlier explained, the armature core indexing pawl 350 is moved for an indexing operation in response to movement of the movable aligning plate 50 into operative position, and the actual indexing of the armature takes place during the later part of such movement of the pawl which is represented by the line $t-u$ in the chart. It is evident that the line $t-u$, representing the indexing movement of the pawl 350, is vertically below the line $c-d$ which represents the movement of the movable aligning plate 50 into operative position. The armature core is naturally arrested against rotation while the various operations are performed upon the armature, there being only a short time interval when the armature core arrester 84 is retracted from the armature during the indexing of the same. Line $v-w$ in the chart represents the cam effected movement of the core arrester 84 out of registry with an armature core slot 66, whereas the line $x-y$ represents the movement of the core arrester 84 into registry with the next following core slot 66 after a completed indexing operation.

It is evident from the preceding that the cam shaft 92 makes one complete revolution and the various devices of the machine perform their assigned operation in order properly to insert an active coil side into a core slot 66 and to connect the coil leads of said inserted coil side with their proper commutator bars. After the various devices of the apparatus have performed their operation on the armature, the same is finally indexed before the cam shaft completes its one revolution thus aligning the next following core slot with the coil positioning device A. The operator again performs the earlier explained preparatory manipulations and finally restarts the one revolution clutch for another machine operation. This is repeated until each core slot receives a coil side and the leads thereof are connected in the described manner with their respective commutator bar slots. The armature support D is then reloaded and a new armature assembled with armature coils in exactly the same manner as just explained.

While the embodiment of the present invention as herein disclosed, constitutes a preferred form, it is to be understood that other forms might be adopted, all coming within the scope of the claims which follow.

We claim:

1. In a coil positioning machine, the combination of a support for an armature assembly including a slotted core and a commutator; and a movable member for receiving and angularly displacing the linearly emerging lead of a coil side in a core slot into alignment with a commutator segment to be connected thereto.

2. In a coil positioning machine, the combination of a support for an armature assembly including a slotted core and a commutator having slotted segments; a movable member for receiving and angularly displacing the linearly emerging lead of a coil side in a core slot into alignment with a segment; and means movable transversely of the member for staking said lead into the slot of the aligned segment.

3. In a coil positioning machine, the combination of a support for an armature assembly including a slotted core and a commutator; a movable member for receiving and angularly displacing the linearly emerging lead of a coil side in a core slot into alignment with a commutator segment to be connected thereto; and means movable transversely of the member for severing excessive length from said lead.

4. In a coil positioning machine, the combination of a support for an armature assembly including a slotted core and a commutator having slotted segments; a movable member for receiving and angularly displacing the linearly emerging lead of a coil side in a core slot into alignment with a segment; and means movable transversely of the member for staking said lead into the slot of the aligned segment and for severing excessive length from said lead.

5. In a coil positioning machine, the combination of a support for rotatably supporting an armature assembly including a slotted core and a commutator; a movable member for receiving and angularly displacing the linearly emerging lead of a coil side in a core slot into alignment with a commutator segment to be connected thereto; and means for indexing the armature assembly.

6. In a coil positioning machine, the combination of a support for rotatably supporting an armature assembly including a slotted core and a commutator having slotted segments; a movable member for receiving and angularly displacing the linearly emerging lead of a coil side in a core slot into alignment with a segment; means movable transversely of the member for staking said lead into the slot of the aligned segment; and means for indexing the armature assembly.

7. In a coil positioning machine, the combination of a support for rotatably supporting an armature assembly including a slotted core and a commutator; a movable member for receiving and angularly displacing the linearly emerging lead of a coil side in a core slot into alignment with a commutator segment to be connected thereto; means movable transversely of the member for severing excessive length from said lead; and means for indexing the armature assembly.

8. In a coil positioning machine, the combination of a support for rotatably supporting an armature assembly including a slotted core and a commutator having slotted segments; a movable member for receiving and angularly displacing the linearly emerging lead of a coil side in a core slot into alignment with a segment; means movable transversely of the member for staking said lead into the slot of the aligned segment and for severing excessive length from said lead; and means for indexing the armature assembly.

9. A coil positioning machine comprising, in combination, a support for an armature assembly including a slotted core and a commutator; means for inserting a coil side into a core slot; and means for angularly displacing the lead of said coil side into alignment with a commutator segment to be connected thereto.

10. A coil positioning machine comprising, in combination, a support for an armature assembly including a slotted core and a commutator having slotted segments; means for inserting a coil side into a core slot; means for angularly displacing the lead of said coil side into alignment with a segment; and means for staking said lead into the slot of the aligned segment.

11. A coil positioning machine comprising, in combination, a support for an armature assembly including a slotted core and a commutator; means for inserting a coil side into a core slot; means for angularly displacing the lead of said coil side into alignment with a commutator segment to be connected thereto; and means for severing excessive length from said lead.

12. A coil positioning machine comprising, in combination, a support for an armature assembly including a slotted core and a commutator having slotted segments; means for inserting a coil side into a core slot; means for angularly displacing the lead of said coil side into alignment with a segment; means for severing excessive length from the lead; and means for staking the lead into the slot of the aligned segment.

13. A coil positioning machine comprising, in combination, a support for an armature assembly including a slotted core and a commutator having slotted segments; means for inserting a coil side into a core slot; means for angularly displacing the lead of said coil side into alignment with a segment; and means for successively severing excessive length from the lead and staking the same into the slot of the aligned segment.

14. A coil positioning machine comprising, in combination, means for rotatably supporting an armature assembly including a slotted core and a commutator; means for inserting a coil side into a core slot; means for angularly displacing the lead of said coil side into alignment with a commutator segment to be connected thereto; and means for arresting the armature assembly against rotation.

15. A coil positioning machine comprising, in combination, means for rotatably supporting an armature assembly including a slotted core and a commutator having slotted segments; means for inserting a coil side into a core slot; means for angularly displacing the lead of said coil side into alignment with a segment; means for staking the lead into the slot of the aligned segment; and means for arresting the armature assembly against rotation.

16. A coil positioning machine comprising, in combination, means for rotatably supporting an armature assembly including a slotted core and a commutator; means for inserting a coil side into a core slot; means for angularly displacing the lead of said coil side into alignment with a commutator segment to be connected thereto; means for severing excessive length from the lead; and means for arresting the armature assembly against rotation.

17. A coil positioning machine comprising, in combination, means for rotatably supporting an armature assembly including a slotted core and a commutator having slotted segments; means for inserting a coil side into a core slot; means for angularly displacing the lead of said coil side into alignment with a segment; means for severing excessive length from the lead; means for staking the lead into the slot of the aligned segment; and means for arresting the armature assembly against rotation.

18. A coil positioning machine comprising, in combination, means for rotatably supporting an armature assembly including a slotted core and a commutator; means for inserting a coil side into a core slot; means for angularly displacing the lead of said coil side into alignment with a commutator segment to be connected thereto; and means for indexing the armature assembly.

19. A coil positioning machine comprising, in combination, means for rotatably supporting an armature assembly including a slotted core and a commutator having slotted segments; means for inserting a coil side into a core slot; means for angularly displacing the lead of said coil into alignment with a segment; means for staking the lead into the slot of the aligned segment; and means for indexing the armature assembly.

20. A coil positioning machine comprising, in combination, means for rotatably supporting an armature assembly including a slotted core and a commutator; means for inserting a coil side into a core slot; means for angularly displacing the lead of said coil side into alignment with a commutator segment to be connected thereto; means for severing excessive length from the lead; and means for indexing the armature assembly.

21. A coil positioning machine comprising, in combination, means for rotatably supporting an armature assembly including a slotted core and a commutator having slotted segments; means for inserting a coil side into a core slot; means for angularly displacing the lead of said coil into alignment with a segment; means for staking the lead into the slot of the aligned segment; means for severing excessive length from the lead; and means for indexing the armature assembly.

22. A coil positioning machine comprising, in combination, means for rotatably supporting an armature assembly including a slotted core and a commutator; means for inserting a coil side into a core slot; means for angularly displacing the lead of said coil side into alignment with a commutator segment to be connected thereto; means for indexing the armature assembly; and means for arresting the armature assembly against rotation between indexing steps thereof.

23. A coil positioning machine comprising, in combination, means for rotatably supporting an armature assembly including a slotted core and a commutator; means for inserting a coil side into a core slot; means for angularly displacing the lead of said coil side into alignment with a commutator segment to be connected thereto; means for severing excessive length from the lead; means for indexing the armature assembly; and means for arresting the armature assembly against rotation between indexing steps thereof.

24. A coil positioning machine comprising, in combination, means for rotatably supporting an armature assembly including a slotted core and a commutator having slotted segments; means for inserting a coil side into a core slot; means for angularly displacing the lead of said coil side into alignment with a segment; means for staking the lead into the slot of the aligned segment; means for indexing the armature assembly; and means for arresting the armature assembly against rotation between indexing steps thereof.

25. A coil positioning machine comprising, in combination, means for rotatably supporting an armature assembly including a slotted core and a commutator having slotted segments; means for inserting a coil side into a core slot; means for angularly displacing the lead of said coil side into alignment with a segment; means for severing excessive length from the lead; means for staking the lead into the slot of the aligned segment; means for indexing the armature assembly; and means for arresting the armature assembly against rotation between indexing steps thereof.

26. A coil positioning machine comprising, in combination, means for supporting an armature assembly including a slotted core and a commutator having slotted segments; a movable device for receiving and angularly displacing the linearly emerging lead of a coil side in a core slot into alignment with a segment; a device movable transversely of the first mentioned device for staking said lead into the slot of the aligned segment; and means for moving all devices in timed relation to each other.

27. A coil positioning machine comprising, in combination, means for supporting an armature assembly including a slotted core and a commutator; a movable device for receiving and angularly displacing the linearly emerging lead of a coil side in a core slot into alignment with a commutator segment; a device movable transversely of the first mentioned device for severing excessive length from said lead; and means for moving all devices in timed relation to each other.

28. A coil positioning machine comprising, in combination, means for supporting an armature assembly including a slotted core and a commutator having slotted segments; a movable device for receiving and angularly displacing the linearly emerging lead of a coil side in a core slot into alignment with a segment; a device movable transversely of the first mentioned device for severing excessive length from said lead and for staking the lead into the slot of the aligned segment; and means for moving all devices in timed relation to each other.

29. A coil positioning machine comprising, in combination, means for supporting an armature assembly including a slotted core and a commutator; a device for inserting a coil side into a core slot; a device for angularly displacing the lead of said coil side into alignment with a commutator segment to be connected thereto; and means for operating all devices in timed relation to each other.

30. A coil positioning machine comprising, in combination, means for supporting an armature assembly including a slotted core and a commutator having slotted segments; a device for inserting a coil side into a core slot; a device for angularly displacing the lead of said coil side into alignment with a segment; a device for staking said lead into the slot of the aligned segment; and means for operating all devices in timed relation to each other.

31. A coil positioning machine comprising, in combination, means for supporting an armature assembly including a slotted core and a commutator; a device for inserting a coil side into a core slot; a device for angularly displacing the lead of said coil side into alignment with a commutator segment to be connected thereto; a device for severing excessive length from said lead; and means for operating all devices in timed relation to each other.

32. A coil positioning machine comprising, in combination, means for supporting an armature assembly including a slotted core and a commutator having slotted segments; a device for inserting a coil side into a core slot; a device for angularly displacing the lead of said coil side into alignment with a segment; a device for severing excessive length from the lead and for staking the same into the slot of the aligned segment; and means for operating all devices in timed relation to each other.

33. A coil positioning machine comprising, in combination, means for rotatably supporting an armature including a slotted core and a commutator; a first device for aligning a coil side with a core slot; a device for angularly displacing the lead of said coil side into alignment with a commutator segment to be connected thereto; means for operating all devices in timed relation to each other; and means for indexing the armature assembly in response to operation of the first device.

34. A coil positioning machine comprising, in combination, means for rotatably supporting an armature assembly including a slotted core and a commutator having slotted segments; a first device for aligning a coil side with a core slot; a device for angularly displacing the lead of said coil side into alignment with a segment; a device for staking said lead into the slot of the aligned segment; means for operating all devices in timed relation with each other; and means for indexing the armature assembly in response to operation of the first device.

35. A coil positioning machine comprising, in combination, means for rotatably supporting an armature including a slotted core and a commutator; a first device for aligning a coil side with a core slot; a device for angularly displacing the lead of said coil side into alignment with a commutator segment to be connected thereto; a device for severing excessive length from said lead; means for operating all devices in timed relation to each other; and means for indexing the armature assembly in response to operation of the first device.

36. A coil positioning machine comprising, in combination, means for rotatably supporting an armature assembly including a slotted core and a commutator having slotted segments; a first device for aligning a coil side with a core slot; a device for angularly displacing the lead of said coil side into alignment with a segment; a device for severing excessive length from the lead; a device for staking said lead into the slot of the aligned segment; means for operating all devices in timed relation with each other; and means for indexing the armature assembly in response to operation of the first device.

37. In a coil positioning machine, the combination of means for rotatably supporting an armature assembly including a slotted core and a commutator; a first device for aligning a coil side with a core slot; a device for inserting said coil side into the aligned core slot; a device for angularly displacing the lead of said coil side into alignment with a commutator segment to be connected thereto; means for operating all devices in timed relation with each other; and means for indexing the armature assembly in response to operation of the first device.

38. In a coil positioning machine, the combination of means for rotatably supporting an armature assembly including a slotted core and a commutator having slotted segments; a first device for aligning a coil side with a core slot; a device for inserting said coil side into the aligned core slot; a device for angularly displacing the lead of said coil side into alignment with a segment; a device for staking said lead into the slot of the aligned segment; means for operating all devices in timed relation with each other; and means for indexing the armature assembly in response to operation of the first device.

39. In a coil positioning machine, the combination of means for rotatably supporting an armature assembly including a slotted core and a commutator; a first device for aligning a coil side with a core slot; a device for inserting said coil side into the aligned core slot; a device for angularly displacing the lead of said coil side into alignment with a commutator segment to be connected thereto; a device for severing excessive length from said lead; means for operating all devices in timed relation with each other; and means for indexing the armature assembly in response to operation of the first device.

40. In a coil positioning machine, the combination of means for rotatably supporting an armature assembly including a slotted core and a commutator having slotted segments; a first device for aligning a coil side with a core slot; a device for inserting said coil side into the aligned core slot; a device for angularly displacing the lead of said coil side into alignment with a segment; a device for severing excessive length from the lead and for staking the same into the slot of the aligned commutator segment; means for operating all devices in timed relation with each other; and means for indexing the armature assembly in response to operation of the first device.

41. A coil positioning machine comprising, in combination, means for rotatably supporting an armature assembly including a slotted core and a commutator having slotted segments; a first device for aligning a coil side with a core slot; a device for inserting said coil side into the aligned core slot; a device for angularly displacing the lead of said coil side into alignment with a segment; a device for severing excessive length from the lead and for staking the same into the slot of the aligned segment; a device for intermittently arresting the armature assembly against rotation; means for operating all devices in timed relation with each other; and means responsive to operation of said first device for indexing the armature assembly between intermittent arrests thereof.

42. In a coil positioning machine, the combination of two plates for squeezing a side of a multi-turn coil therebetween; and links, each pivoted to both plates to permit movement of one plate relative to the other plate, said links being spaced transversely of the coil side between the plates.

43. In a coil positioning machine, the combination of two plates, one being disposed in a certain plane and both plates being adapted to squeeze a side of a multi-turn coil therebetween; and links spaced transversely of the coil side between the plates and each being so pivoted to both plates as to permit movement of said one plate relative to the other plate while remaining disposed in planes parallel to said certain plane.

44. In a coil positioning machine, the combination of two parallel plates adapted to squeeze a side of a multi-turn coil therebetween; and links spaced transversely of the coil side between the plates and each being so pivoted to both plates as to permit movement of one plate relative to the other plate while both plates remain parallel to each other.

45. In a coil positioning machine, the combination of two plates for squeezing a side of a multi-turn coil therebetween; links, each pivoted to both plates to permit movement of one plate relative to the other plate, said links being spaced transversely of the coil side between the plates; and a blade movable between the squeezing plates for ejecting a squeezed coil side from the plates into the aligned slot of an armature core.

46. In a coil positioning machine, the combination of means for rotatably supporting an armature assembly including a slotted core; two plates, one being stationary and both being adapted to squeeze a coil side therebetween; links pivoted to both plates to permit movement of the other plate relative to the stationary plate; and a pawl carried by one of the links and adapted to register with a core slot to index the armature assembly upon separation of the plates.

47. In a coil positioning machine, the combination of means for rotatably supporting an armature assembly including a slotted core; two plates, one being stationary and both being adapted to squeeze a coil side therebetween; links pivoted to both plates to permit movement of the other plate relative to the stationary plate, one of said links having a shoulder; and a pawl pivoted to said one link and normally urged into engagement with said shoulder so that the pawl will successively move into registry with a core slot and index the armature assembly upon separation of the plates.

48. In a coil positioning machine, the combination of a frame providing an annular recess; a hollow disc angularly adjustably mounted in said recess; means mounted in said disc and including a stationary and a movable member for squeezing a coil side; and a lever pivoted to the frame and loosely engaging the movable member for operating the same.

49. In a coil positioning machine, the combination of a frame providing an annular recess; a support for an armature assembly including a slotted core; a hollow disc angularly adjustably mounted in said recess; means mounted in the hollow disc and including a stationary member and movable members for squeezing a coil side and inserting the same into an aligned core slot; and levers pivoted to the frame and loosely engaging the movable members for operating the same.

50. In a coil positioning machine, the combination of a support for an armature assembly including a slotted core and a commutator; and means providing a notch for receiving the lead of a coil side in a core slot, said means being movable transversely of the notch such that the latter is movable from substantial alignment with said coil side to a point adjacent a commutator segment to which the lead is to be connected.

51. In a coil positioning machine, the combination of a support for an armature assembly including a slotted core and a commutator; means providing a notch for receiving the lead of a coil side in a core slot, said means being movable transversely of the notch such that the latter is movable from substantial alignment with said coil side to a point adjacent a commutator segment to which the lead is to be connected; and means for ejecting the lead from the notch and securing the same to the adjacent segment.

52. In a coil positioning machine, the combination of a support for an armature assembly including a slotted core and a commutator; a device for inserting a coil side into a core slot; and means providing a notch for receiving the lead of of said coil side, said means being movable transversely of the notch such that the latter is movable from substantial alignment with said coil side to a point adjacent a commutator segment to which the lead is to be connected.

53. In a coil positioning machine, the combination of a support for an armature assembly including a slotted core and a commutator; a device for inserting a coil side into a core slot; means providing a notch for receiving the lead of said coil side, said means being movable transversely of the notch such that the latter is movable from substantial alignment with said coil side to a point adjacent a commutator segment; and means for ejecting the lead from the notch and securing the same to the adjacent segment.

54. In a coil positioning machine, the combination of a support for an armature assembly including a slotted core and a commutator having slotted segments; a device for inserting a coil side into a core slot; means providing a notch for receiving the lead of said coil side, said means being movable transversely of the notch such that the latter is movable from substantial alignment with said coil side into radial alignment with a segment slot; and means movable radially of the commutator for ejecting the lead from the notch into the aligned segment slot.

55. In a coil positioning machine, the combination of a support for an armature assembly including a slotted core and a commutator; and means providing a wedge shaped notch for receiving the lead of a coil side in a core slot, said means being movable transversely of a notch wall such that the notch is movable from substantial alignment with said coil side to a point adjacent a commutator segment to which the lead is to be connected, the narrow portion of said notch being adjacent the segment.

56. In a coil positioning machine, the combination of a support for an armature assembly including a slotted core and a commutator; and a member providing a notch for receiving the lead of a coil side in a core slot, said member being so pivoted that the notch is movable transversely of one of its walls from substantial alignment which said coil side to a point adjacent a commutator segment to which the lead is to be connected.

57. In a coil positioning machine, the combination of a support for an armature including a slotted core and a commutator; means for providing a notch for receiving the lead of a coil side in a core slot, and a shearing edge extending across said notch, said means being movable transversely of the notch such that the latter is movable from substantial alignment with said coil side into alignment with a commutator segment; and movable means for ejecting the lead from the notch and securing the same to the adjacent segment, said means including a shearing edge cooperating with that in the notch for severing excessive length from said lead.

58. In a coil positioning machine, the combination of a support for an armature including a slotted core and a commutator having slotted segments; means providing a notch for receiving the lead of a coil side in a core slot, and a shearing edge extending across said notch, said means being movable transversely of the notch such that the latter is movable from substantial alignment with said coil side into alignment with a segment slot; and a movable blade having a shearing edge cooperating with that in the notch for severing excessive length from the lead, and a portion for ejecting the shorn lead from the notch into the aligned segment slot.

59. In a coil positioning machine, the combination of means for supporting an armature assembly including a commutator having slotted segments; means for locating an armature coil lead in alignment with a segment slot; a pivoted lever carrying a blade for forcing the located lead into the aligned segment slot; a rotatable cam for actuating the lever; and a member of compressible material for imparting the cam stroke to the lever.

60. In a coil positioning machine, the combination of means for supporting an armature assembly including a commutator having slotted segments; means for locating an armature coil lead in alignment with a segment slot; a pivoted first lever carrying a blade for forcing the located lead into the aligned segment slots; another lever pivoted with one end to the first lever; a member of compressible material interposed between both levers; and a rotatable cam cooperating with said other lever for actuating the first lever.

61. In a coil positioning machine, the combination of means for supporting an armature assembly including a commutator having slotted segments; means for locating an armature coil lead in alignment with a segment slot; a pivoted first lever carrying a blade for forcing the located lead into the aligned segment slot; another lever pivoted with one end to the first lever; a member of compressible material interposed between the first lever and the other end of said other lever; and a rotatable cam cooperating with said other lever substantially midway thereof for actuating the first lever.

62. In a coil positioning machine, the combination of means for supporting an armature assembly including a slotted core and a commutator; a member providing a notch for receiving the lead of a coil side in a core slot, said member being movable transversely of the notch such that the letter is movable from normal substantial alignment with said coil side into alignment with a commutator segment; a pivoted lever carrying a blade for ejecting the lead from the notch and securing it to the aligned segment; and coordinated cam means for actuating the member and for rocking the lever so as to withdraw the blade from the commutator prior to the return of the member into normal alignment with said coil side.

63. In a coil positioning machine, the combination of means for supporting an armature assembly including a slotted core and a commutator; a member providing a notch for receiving the lead of a coil side in a core slot, said member being movable transversely of the notch such that the latter is movable from normal substantial alignment with said coil side into alignment with a commutator segment; a pivoted lever carrying a blade for ejecting the lead from the notch and securing it to the aligned segment; coordinated cam means for actuating the member and for rocking the lever to withdraw the blade from the commutator prior to the return of the member into normal alignment with said coil side; a cam coordinated with said cam means and adapted to rock the lever to move the blade toward the commutator; and a member of compressible material for imparting the stroke of said cam to the lever.

64. In a coil positioning machine, the combination of a mechanism for inserting a coil side into a core slot of an armature assembly; a shiftable device for rotatably supporting the armature assembly, said device normally shifting into a loading position by gravity; and means for arresting the device in coil receiving position.

65. In a coil positioning machine, the combination of a mechanism for inserting a coil side into a core slot of an armature assembly; a device for rotatably supporting the armature assembly, said device being pivotally mounted and normally rotating into a loading position by gravity; and means for arresting the device in coil receiving position.

66. In a coil positioning machine, the combination of a mechanism for inserting an active coil side into a core slot of an armature assembly including a slotted core and an armature shaft; and a device providing bearings for the armature shaft and being rotatable from a loading position into coil receiving position, said bearings being longitudinally slotted for the lateral introduction of the armature shaft.

67. In a coil positioning machine, the combination of a mechanism for inserting a coil side into a core slot of an armature assembly including a slotted core, a commutator and an armature shaft; a device providing bearings for the armature shaft and being rotatable from a loading position into a coil receiving position, said bearings being longitudinally slotted for the lateral introduction of the armature shaft; and a spring urged plunger in one of the bearings, adapted to engage one end of the armature shaft and shift the same further into the other bearing beyond the slot thereof until the commutator bears against said other bearing.

68. In a coil positioning machine, the combination of a mechanism for inserting a coil side into a core slot of an armature assembly including a slotted core, a commutator and an armature shaft; a device providing bearings for the armature shaft and being rotatable from a loading position into a coil receiving position, said bearings being longitudinally slotted for the lateral introduction of the armature shaft; and a spring urged plunger in one of the bearings, said plunger having an annular recess concentric of said one bearing and adapted to engage one end of the armature shaft and shift the same further into the other bearing beyond the slot thereof until the commutator bears against said other bearing.

69. In a coil positioning machine, the combination of a mechanism for inserting a coil side into a core slot of an armature assembly including a slotted core, a commutator and an armature shaft; a device providing bearings for the armature shaft and being rotatable from a loading position into a coil receiving position, said bearings being longitudinally slotted for the lateral introduction of the armature shaft; a spring urged plunger in one of the bearings, adapted to shift one end of the armature shaft further into the other bearing beyond the slot thereof until the commutator bears against said other bearing; and means responsive to rotation of the device into loading position for withdrawing the plunger from the armature shaft.

EDWARD W. COLLINS.
LORA E. POOLE.
CHARLES A. NICHOLS.